United States Patent
Matcha et al.

(10) Patent No.: US 9,549,189 B2
(45) Date of Patent: Jan. 17, 2017

(54) METHOD FOR MEDIA RATE CONTROL IN A VIDEO ENCODING SYSTEM

(71) Applicant: ITTIAM SYSTEMS (P) LTD., Bangalore (IN)

(72) Inventors: Chaitanya Kumar Matcha, Bangalore (IN); Durga Venkatanarayanababu Laveti, Bangalore (IN); Puneet Gupta, Bangalore (IN); Swapan Kumar Kundu, Bangalore (IN); Bhavani Gopalakrishna Rao, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 625 days.

(21) Appl. No.: 13/669,490

(22) Filed: Nov. 6, 2012

(65) Prior Publication Data
US 2014/0126626 A1    May 8, 2014

(51) Int. Cl.
| | | |
|---|---|---|
| *H04B 7/12* | (2006.01) | |
| *H04N 11/02* | (2006.01) | |
| *H04N 11/04* | (2006.01) | |
| *H04B 1/66* | (2006.01) | |
| *H04N 19/154* | (2014.01) | |
| *H04N 19/196* | (2014.01) | |
| *H04N 19/115* | (2014.01) | |

(52) U.S. Cl.
CPC .......... *H04N 19/154* (2014.11); *H04N 19/115* (2014.11); *H04N 19/196* (2014.11)

(58) Field of Classification Search
CPC ...................................................... H04N 7/26
USPC ...................... 375/240.02, E07.126, E07.226
See application file for complete search history.

(56) References Cited

U.S. PATENT DOCUMENTS

| | | | | |
|---|---|---|---|---|
| 5,566,208 A | * | 10/1996 | Balakrishnan ... | H04N 21/23406 370/468 |
| 5,986,712 A | * | 11/1999 | Peterson .............. | H04N 19/159 375/240.14 |
| 7,668,094 B2 | * | 2/2010 | Birmiwal ........... | H04N 21/4305 370/229 |

(Continued)

OTHER PUBLICATIONS

Wang, D., F. Speranza, A. Vincent, T. Martin, and P. Blanchfield, Towards Optimal Rate Control: A Study of the Impact of Spatial Resolution, Frame Rate, and Quantization on Subjective Video Quality and Bit Rate, Visual Communications and Image Processing, Proceedings of SPIE vol. 5150, 2003.*

(Continued)

*Primary Examiner* — Jamie Atala
*Assistant Examiner* — Richard A Hansell, Jr.
(74) *Attorney, Agent, or Firm* — Prakash Nama; Global IP Services, PLLC

(57) ABSTRACT

A method for media rate control in a video encoding system disclosed. In one embodiment, an optimal remaining one of the three parameter sets (Sk) is computed based on the provided user configuration inputs of two parameters sets (Si, Sj), wherein the user configuration inputs comprise two parameter sets (Si and Sj) out of three parameter sets (Si, Sj, and Sk), wherein the three parameter sets are latency parameter set, channel bandwidth parameter set, and video quality parameter set. The video encoding system is then configured based on the provided two parameter sets (Si, Sj) and the computed parameter set (Sk) to obtain a desired media rate control having optimal performance.

11 Claims, 2 Drawing Sheets

(56) References Cited

U.S. PATENT DOCUMENTS

| | | | | |
|---|---|---|---|---|
| 2005/0120128 | A1* | 6/2005 | Willes | H04N 21/00 709/232 |
| 2006/0233237 | A1* | 10/2006 | Lu | H04N 19/176 375/240.03 |
| 2008/0267069 | A1* | 10/2008 | Thielman | H04N 7/142 370/235 |
| 2010/0080292 | A1* | 4/2010 | Coulombe | H04N 19/00569 375/240.12 |
| 2011/0090960 | A1* | 4/2011 | Leontaris | H04N 19/103 375/240.12 |
| 2011/0142125 | A1* | 6/2011 | Tripathi | H04N 19/149 375/240.03 |
| 2012/0307885 | A1* | 12/2012 | Agarwal | H04W 72/1252 375/240.02 |
| 2012/0307886 | A1* | 12/2012 | Agarwal | H04W 4/18 375/240.02 |
| 2013/0007200 | A1* | 1/2013 | van der Schaar | H04L 43/0888 709/217 |
| 2013/0128955 | A1* | 5/2013 | Chen | H04N 21/23406 375/240.02 |

OTHER PUBLICATIONS

Singh, K.D., Y. Hadjadj-Aoul and G. Rubino, Quality of Experience Estimation for Adaptive HTTP/TCP Video Streaming Using H.264/AVC, 9th Annual IEEE Consumer communications and Networking Conference, doi: 10.1109/CCNC.2012.6181070, Jan. 14-17, 2012.*

Paravati G. A. Sanna, F. Lamberti, L. Ciminiera, An Adaptive Control System to Deliver Interactive Virtual Environment Content to Handheld Devices, Mobile Netw Appl 16:385-393, doi: 10.1007/s11036-010-0255-5, 2011.*

Jin, L.S., L.S. Wei, S. Lau, E. Karuppiah, "Link Quality Prediction for Multimedia Streaming based on Available Bandwidth and Latency", WNM 2013, The 7th IEEE Workshop on Network Measurements.*

* cited by examiner

US 9,549,189 B2

METHOD FOR MEDIA RATE CONTROL IN A VIDEO ENCODING SYSTEM

TECHNICAL FIELD

Embodiments of the present subject matter relate to media rate control. More particularly, embodiments of the present subject matter relate to method for media rate control in a video encoding system.

BACKGROUND

Typically, data transfer limitations for a physical interface, such as USB, SDIO, PCI, TSIF and the like or a packet network interface, such as Ethernet often require that the video traffic on these channels is rate controlled, i.e., is regulated, such that it is rate controlled. Rate control refers to adhering to a pre-defined characteristic of data transfer over a channel based on average and peak data rate constraints. In cases where these channels are being used by more than one user, it is even more important to shape the video traffic in a manner that is conducive to the shared channel usage. The basic media pipeline for streaming or recording channels includes video capture, video pre-processing, video encoding and formatting (example: header addition, packetization, file format creation) based on destination. Further, user experience in video streaming and recording applications can be identified based on encoder and system performance in terms of parameters, such as perceived quality, required channel bandwidth, and achieved latency. However, in many systems, the expectations of performance on these three vectors may be mutually conflicting. For example, a marginal deviation in peak bandwidth of encoded data or increased system latency may result in degradation of the user experience due to effects like packet drops or late arrival of video frames at the destination.

In a simple rate control algorithm, the video encoder can allocate a fixed number of bytes for each frame (given by bandwidth*latency/frames per latency duration) to achieve the constraints of bandwidth and latency. However, allocating the same number of bytes for every frame may not be optimal in terms of quality.

In another existing implementation, large frames may be generated by the video encoder for achieving a higher quality. However, the time required to send this large encoded frame while adhering to a constrained bandwidth may be high and hence the latency requirement may be compromised. Alternatively, the system may burst the encoded frames onto network to achieve low latency. However, in this case, the channel bandwidth constraints may be violated.

In a trade-off across these three mutually conflicting performance requirements, it is often possible to fix two of the performance requirements and achieve the best possible performance for the third requirement. Marginal degradation in video encode bit rate is not often perceivable; however, not meeting the latency or channel bandwidth requirements may result in severe user inconvenience. Hence, in a case requiring all three performance requirements, latency and channel bandwidth requirements can be strictly met trying to achieve the best possible quality.

Typical video encode processing module takes parameters like average encode bit rate, VBV buffer size and key frame interval. These parameters have to be derived based on the three performance requirements.

Because of the latency incurred for transmission, there is a need for buffering in the system. Hence, system management parameters like buffering requirements and drain rate have to be identified based on the three performance requirements. However, these system management parameters are applicable for the entire video encode pipeline.

BRIEF DESCRIPTION OF THE DRAWINGS

Various embodiments are described herein with reference to the drawings, wherein.

The systems and methods disclosed herein may be implemented in any means for achieving various aspects. Other features will be apparent from the accompanying drawings and from the detailed description that follow.

DETAILED DESCRIPTION

Method for media rate control in video encoding system is disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
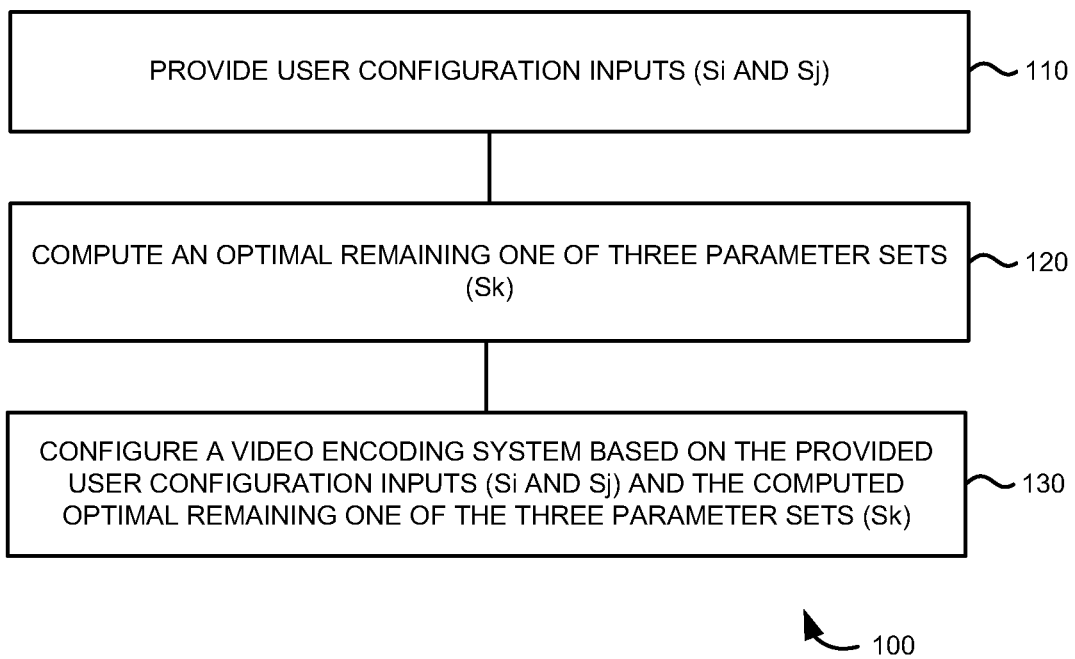
FIG. 1 illustrates a flowchart of a method for media rate control in a video encoding system, according to one embodiment.

FIG. 1 illustrates a flowchart 100 describing the steps for media rate control in video encoding system, according to one embodiment. Exemplary video encoding systems include, live video recording systems, live video streaming, video transcoding and the like. At block 110, user configuration inputs are provided. User configuration inputs comprise two parameter sets (Si and Sj) out of three parameter sets (Si, Sj, and Sk). The three parameter sets are latency parameter set, channel bandwidth parameter set, and video quality parameter set. In some embodiments, the latency parameter set includes an average latency in video frame durations ($L_{avg}$) and a peak instantaneous latency in video frame durations ($L_{peak}$). In some embodiments, the channel bandwidth parameter set is an available channel bandwidth ($BW_{chan}$). In some embodiments, the video quality parameter set includes an average encoder output bit rate ($BR_{enc}$) and a VBV buffer allowance ($N_{vbv}$) in terms of number of average encoded video frame size that is based on an average encode bit rate and an encoded video frame rate.

At block 120, a remaining one of the three parameter sets (Sk) is computed based on the provided two parameters sets (Si, Sj). In some embodiments, the remaining one of the three parameter sets based on the provided two of the three parameter sets is computed using the following mathematical model:

$$L_{peak} = \frac{N_{VBV}}{R_b}$$

-continued $$L_{avg} = \frac{N_{peaks}(R_{max} - 1)(N_{VBV} + R_b - 2R_2)}{2R_b(N_b - N_{peaks})(R_b - R_2)} + \frac{R_2}{R_b}$$

wherein $R_2$ and $R_b$ are computed using, $$R_2 = \frac{N_b - R_{max}N_{peaks}}{N_b - N_{peaks}}$$

$$R_b = \frac{BW_{chan}}{BR_{enc}}$$

wherein $N_b$ is a number of video frames over which an average encoded bit rate is achieved, $R_{max}$ is a ratio between maximum allowed encoded video frame size and average encoded video frame size, and $N_{peaks}$ is a number of video frames of size $R_{max}$ that can be observed over the durations of $N_b$ video frames based on a key frame interval and number of scene changes expected in the duration.

At step 130, the video encoding system is configured based on the provided two parameter sets (Si, Sj) and the computed parameter set (Sk) to obtain a desired media rate control. In some embodiments, video encode parameters (VEPs) and system management parameters (SMPs) are computed based on the provided user configuration inputs including the two of the three parameter sets (Si and Sj) and the computed remaining one of the three parameter sets (Sk). The video encoding system is then configured based on the computed VEPs and SMPs to obtain the media rate control. In these embodiments, configuring the video encoding system includes configuring a video processing module, residing in the video encoding system, using the computed VEPs. Further configuring a video encoding pipeline, residing in the video encoding system, using the computed SMPs to obtain the desired media rate control.

Figure 2:
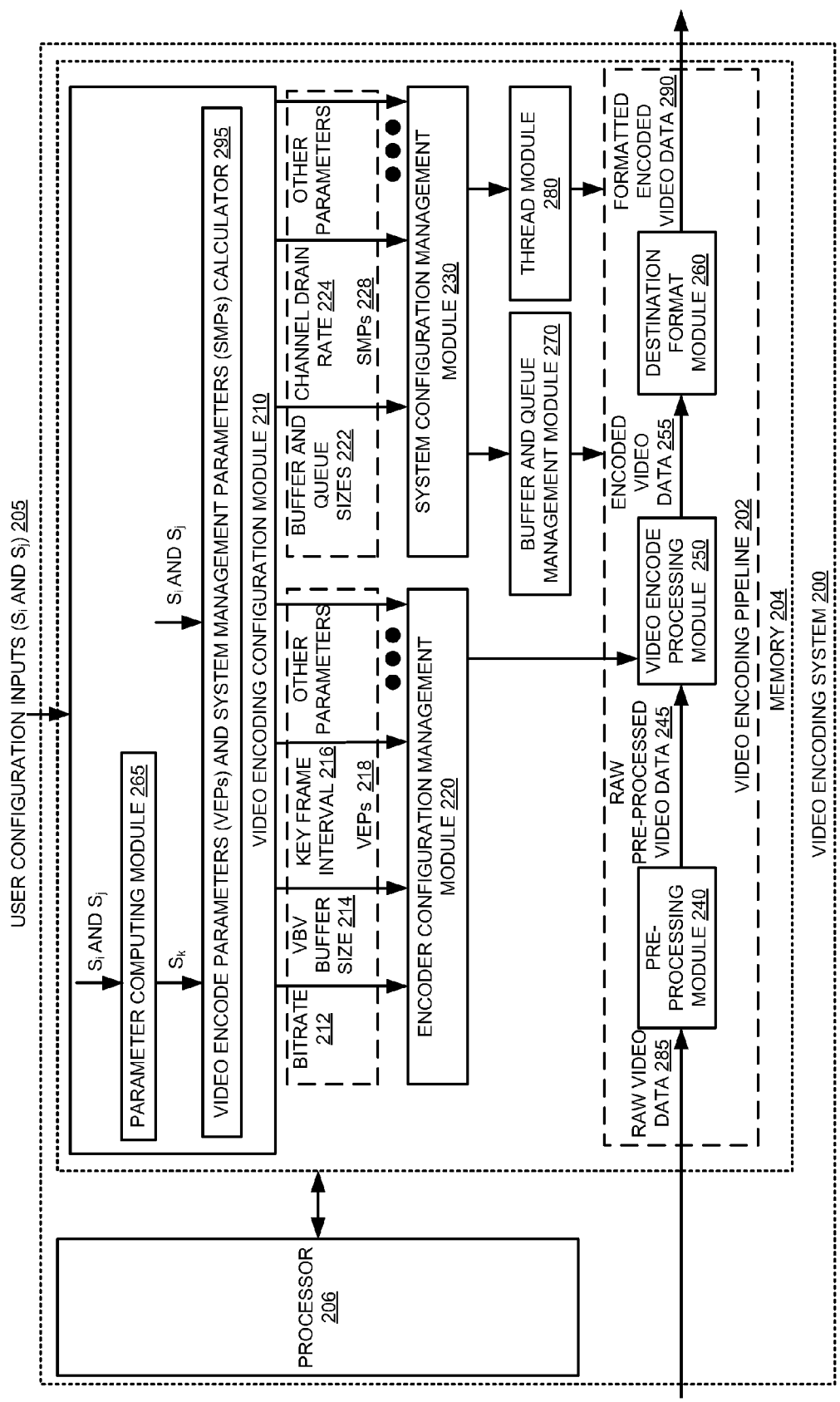
FIG. 2 illustrates a block diagram of a video encoding system for media rate control including major components and modules, such as shown in FIG. 1, according to one embodiment.

Referring now to FIG. 2, which illustrates a block diagram of a video encoding system 200, configured for media rate control as recited in FIG. 1, according to one embodiment of this disclosure. As shown in FIG. 2, the video encoding system includes a processor 206 and memory 204. Further as shown in FIG. 2, a video encoding configuration module 210, an encoder configuration management module 220, a system configuration management module 230, a buffer and queue management module 270, a thread module 280, and a video encoding pipeline 202 all residing in the memory 204. In addition as shown in FIG. 2, the video encoding configuration module 210 includes a parameter computing module 265 and a video encode parameters (VEPs) and System management parameters (SMPs) calculator 295. Also as shown in FIG. 2, the video encoding pipeline 202 includes a preprocessing module 240 configured to receive a raw video data 285 and output a raw pre-processed video data 245, a video encode processing module 250 configured to receive the raw pre-processed video data 245 and output encoded video data 255, and a destination format module 260 configured to receive the encoded video data 255 and output formatted encoded video data 290.

In operation, user configuration inputs including two parameter sets (Si and Sj) 205 out of three parameter sets (Si, Sj, and Sk) are received by the video encoding configuration module 210. Upon receiving the user configuration inputs (Si and Sj) 205, the video encoding configuration module 210 computes a remaining one of the three parameter sets (Sk) based on the provided two parameters sets (Si, Sj) 205.

The three parameter sets are latency parameter set, channel bandwidth parameter set, and video quality parameter set. In some embodiments, the latency parameter set includes an average latency in video frame durations ($L_{avg}$) and a peak instantaneous latency in video frame durations ($L_{peak}$). In some embodiments, the channel bandwidth parameter set is an available channel bandwidth ($BW_{chan}$). In some embodiments, the video quality parameter set includes an average encoder output bit rate ($BR_{enc}$) and a VBV buffer allowance ($N_{vbv}$) in terms of number of average encoded video frame size that is based on an average encode bit rate and an encoded video frame rate.

In some embodiments, the user configuration inputs including two parameter sets (Si and Sj) 205 out of three parameter sets (Si, Sj, and Sk) are received by the parameter computing module 265 and the video encode parameters (VEPs) and system management parameters (SMPs) calculator 295. Upon receiving the user configuration inputs including two parameter sets (Si and Sj) 205 the parameter computing module 265 computes the remaining one of the three parameter sets (Sk) and inputs it to the VEPs and SMPs calculator 295.

In some embodiments, the parameter computing module computes the remaining one of the three parameter sets (Sk) using a mathematical model:

$$L_{peak} = \frac{N_{VBV}}{R_b}$$

$$L_{avg} = \frac{N_{peaks}(R_{max} - 1)(N_{VBV} + R_b - 2R_2)}{2R_b(N_b - N_{peaks})(R_b - R_2)} + \frac{R_2}{R_b}$$

wherein $R_2$ and $R_b$ are computed using, $$R_2 = \frac{N_b - R_{max}N_{peaks}}{N_b - N_{peaks}}$$

$$R_b = \frac{BW_{chan}}{BR_{enc}}$$

wherein $N_b$ is a number of video frames over which an average encoded bit rate is achieved, $R_{max}$ is a ratio between maximum allowed encoded video frame size and average encoded video frame size, and $N_{peaks}$ is a number of video frames of size $R_{max}$ that can be observed over the durations of $N_b$ video frames based on a key frame interval and number of scene changes expected in the duration.

In these embodiments, upon computing the remaining one of the three parameter sets (Sk) by the parameter computing module 265, the video encoding system is configured based on the provided two parameter sets (Si, Sj) and the computed parameter set (Sk) to obtain a desired media rate control.

In some embodiments, upon computing the remaining one of the three parameter sets (Sk) by the parameter computing module 265, the video encoding configuration module 210 computes video encode parameters (VEPs) and system management parameters (SMPs) based on the provided user configuration inputs including the two of the three parameter sets (Si and Sj) and the computed remaining one of the three parameter sets (Sk).

Further in these embodiments, the encoder configuration management module 220 is configured to receive the computed VEPs from the video encoding configuration module 210 and configure the video encode processing module 250. Also, in these embodiments, the system configuration management module along with the buffer and queue management module 270, and the thread module 280 are configured to receive the computed SMPs from the video encoding configuration module 210 and configure the video encoding pipeline 202 to provide the desired media rate control in the video encoding system 200.

FIG. 2 and the following discussions are intended to provide a brief, general description of a suitable computing environment in which certain embodiments of the inventive concepts contained herein are implemented.

The processor 206, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 206 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 206 of the video encoding system 200. For example, a computer program based on above described modules includes machine-readable instructions capable of performing media rate control in the video encoding system 200, according to the teachings and herein described embodiments of the present subject matter. The machine-readable instructions cause the video encoding system 200 to carry out the media rate control according to the various embodiments of the present subject matter.

As shown, the computer program includes the media rate control algorithm. For example, the media rate control algorithm can be in the form of instructions stored on a non-transitory computer-readable storage medium. The non-transitory computer-readable storage medium having the instructions that, when executed by the video encoding system 200, causes the video encoding system 305 to perform the one or more methods as described in FIG. 1.

In various embodiments, systems and methods described with reference to FIGS. 1 and 2 propose the media rate control in a video encoding system. The above technique identifies achieving best possible video quality parameters (for example, video encoding bit rate and VBV buffering) based on user provided bandwidth and latency parameters. The above technique identifies a best possible bit rate and VBV buffer configuration parameters for given system level requirements. The above solution identifies a model for the worst case encoder output which identifies a best possible quality for given bandwidth and latency constraint parameters. Further, with the above technique, with a marginal increase in (channel bandwidth/encode bit rate) ratio (Rb), a significant reduction in latency may be achieved. Furthermore, based on the above mathematical model, a tradeoff between latency vs bandwidth vs quality can be obtained. The above technique identifies a best tradeoff between latency, bandwidth and quality requirements to achieve a desired media rate control for a video encoding system. Moreover, the above technique allows deterministically achieving latency requirements based on channel bandwidth constraints to attain a best possible quality.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for media rate control in a video encoding system, comprising:
   providing user configuration inputs, wherein the user configuration inputs comprise two parameter sets (Si and Sj) out of three parameter sets (Si, Sj, and Sk), wherein the three parameter sets are latency parameter set, channel bandwidth parameter set, and video quality parameter set, and wherein the parameter set Si is the latency parameter set;
   computing an optimal remaining one of the three parameter sets (Sk) based on the provided two parameters sets (Si, Sj), wherein computing the optimal remaining one of the three parameter sets (Sk) comprises one of:
      computing the channel bandwidth parameter set using the provided latency parameter set and the provided video quality parameter set as inputs; and
      computing the video quality parameter set using the provided latency parameter set and the provided channel bandwidth parameter set as inputs, wherein the latency parameter set comprises an average latency in video frame durations ($L_{avg}$) and a peak instantaneous latency in video frame durations ($L_{peak}$), wherein the channel bandwidth parameter set comprises an available channel bandwidth ($BW_{chan}$), and wherein the video quality parameter set comprises an average encoder output bit rate ($BR_{enc}$), a VBV buffer allowance in terms of number of average encoded video frame size that is based on an average encode bit rate and an encoded video frame rate ($N_{vbv}$), and ratio between maximum allowed encoded video frame size and average encoded video frame size ($R_{max}$); and
   configuring the video encoding system based on the provided two parameter sets (Si, Sj) and the computed parameter set (Sk) for a desired media rate control having optimal performance.

2. The method of claim 1, wherein configuring the video encoding system based on the provided two parameter sets (Si, Sj) and the computed parameter set (Sk) comprises:
   computing video encode parameters (VEPs) and system management parameters (SMPs) based on the provided user configuration inputs including the two of the three parameter sets (Si and Sj) and the computed remaining one of the three parameter sets (Sk); and
   configuring the video encoding system based on the computed VEPs and SMPs to obtain the media rate control.

3. A method for media rate control in a video encoding system, comprising:
   providing user configuration inputs, wherein the user configuration inputs comprise two parameter sets (Si and Sj) out of three parameter sets (Si, Sj, and Sk), wherein the three parameter sets are latency parameter set, channel bandwidth parameter set, and video quality parameter set;
   computing an optimal remaining one of the three parameter sets (Sk) based on the provided two parameters sets (Si, Sj), wherein the remaining one of the three parameter sets based on the provided two of the three parameter sets is computed using the following mathematical model:

$$L_{peak} = \frac{N_{VBV}}{R_b}$$

$$L_{avg} = \frac{N_{peaks}(R_{max} - 1)(N_{VBV} + R_b - 2R_2)}{2R_b(N_b - N_{peaks})(R_b - R_2)} + \frac{R_2}{R_b}$$

wherein $R_2$ and $R_b$ are computed using, $$R_2 = \frac{N_b - R_{max}N_{peaks}}{N_b - N_{peaks}}$$

$$R_b = \frac{BW_{chan}}{BR_{enc}}$$

wherein $N_b$ is a number of video frames over which an average encoded bit rate is achieved, $R_{max}$ is a ratio between maximum allowed encoded video frame size and average encoded video frame size, and $N_{peaks}$ is a number of video frames of size $R_{max}$ that can be observed over durations of $N_b$ video frames based on a key frame interval and number of scene changes expected in a duration; and configuring the video encoding system based on the provided two parameter sets (Si, Sj) and the computed parameter set (Sk) for a desired media rate control having optimal performance.

4. The method of claim 2, further comprising:
configuring a video processing module using the VEPs; and
further configuring a video encoding pipeline using the SMPs to obtain the desired media rate control.

5. A video encoding system, comprising:
processor; and
memory operatively coupled to the processor, wherein the memory comprising a video encoding configuration module configured to:
provide user configuration inputs, wherein the user configuration inputs comprise two parameter sets (Si and Sj) out of three parameter sets (Si, Sj, and Sk), wherein the three parameter sets are latency parameter set, channel bandwidth parameter set, and video quality parameter set, and wherein the parameter set Si is the latency parameter set;
compute a remaining one of the three parameter sets (Sk) based on the provided two parameters sets (Si, Sj), wherein computing the remaining one of the three parameter sets (Sk) comprises one of:
  computing the channel bandwidth parameter set using the provided latency parameter set and the provided video quality parameter set as inputs; and
  computing the video quality parameter set using the provided latency parameter set and the provided channel bandwidth parameter set as inputs, wherein the latency parameter set comprises an average latency in video frame durations ($L_{avg}$) and a peak instantaneous latency in video frame durations ($L_{peak}$), wherein the channel bandwidth parameter set comprises an available channel bandwidth ($BW_{chan}$), and wherein the video quality parameter set comprises an average encoder output bit rate ($BR_{enc}$), a VBV buffer allowance in terms of number of average encoded video frame size that is based on an average encode bit rate and an encoded video frame rate ($N_{vbv}$), and ratio between maximum allowed encoded video frame size and average encoded video frame size ($R_{max}$); and
configure the video encoding system based on the provided two parameter sets (Si, Sj) and the computed parameter set (Sk) to obtain a desired media rate control.

6. The system of claim 5, wherein the video encoding configuration module is further configured to:
compute video encode parameters (VEPs) and system management parameters (SMPs) based on the provided user configuration inputs including the two of the three parameter sets (Si and Sj) and the computed remaining one of the three parameter sets (Sk); and
configure the video encoding system based on the computed VEPs and SMPs to obtain the media rate control.

7. A video encoding system, comprising:
processor, and
memory operatively coupled to the processor, wherein the memory comprising a video encoding configuration module configured to:
provide user configuration inputs, wherein the user configuration inputs comprise two parameter sets (Si and Sj) out of three parameter sets (Si, Sj, and Sk), wherein the three parameter sets are latency parameter set, channel bandwidth parameter set, and video quality parameter set;
compute a remaining one of the three parameter sets (Sk) based on the provided two parameters sets (Si, Sj), wherein the remaining one of the three parameter sets based on the provided two of the three parameter sets is computed using the following mathematical model:

$$L_{peak} = \frac{N_{VBV}}{R_b}$$

$$L_{avg} = \frac{N_{peaks}(R_{max} - 1)(N_{VBV} + R_b - 2R_2)}{2R_b(N_b - N_{peaks})(R_b - R_2)} + \frac{R_2}{R_b}$$

wherein $R_2$ and $R_b$ are computed using, $$R_2 = \frac{N_b - R_{max}N_{peaks}}{N_b - N_{peaks}}$$

$$R_b = \frac{BW_{chan}}{BR_{enc}}$$

wherein $N_b$ is a number of video frames over which an average encoded bit rate is achieved, $R_{max}$ is a ratio between maximum allowed encoded video frame size and average encoded video frame size, and $N_{peaks}$ is a number of video frames of size $R_{max}$ that can be observed over durations of $N_b$ video frames based on a key frame interval and number of scene changes expected in a duration; and
configure the video encoding system based on the provided two parameter sets (Si, Sj) and the computed parameter set (Sk) to obtain a desired media rate control.

8. The system of claim 5, wherein the memory further comprising:
   an encoder configuration module and a video encode processing module in a video encoding pipeline, wherein the encoder configuration module to configure the video processing module using the VEPs; and
   a buffer and queue management module and a thread module for further configuring the video encoding pipeline using the SMPs to obtain the desired media rate control.

9. A non-transitory computer-readable storage medium for media rate control in a video encoding system, when executed by a computing device, cause the computing device to:
   provide user configuration inputs, wherein the user configuration inputs comprise two parameter sets (Si and Sj) out of three parameter sets (Si, Sj, and Sk), wherein the three parameter sets are latency parameter set, channel bandwidth parameter set, and video quality parameter set, and wherein the parameter set Si is the latency parameter set;
   compute a remaining one of the three parameter sets (Sk) based on the provided two parameters sets (Si, Sj), wherein computing the remaining one of the three parameter sets (Sk) comprises one of:
      computing the channel bandwidth parameter set using the provided latency parameter set and the provided video quality parameter set as inputs; and
      computing the video quality parameter set using the provided latency parameter set and the provided channel bandwidth parameter set as inputs, wherein the latency parameter set comprises an average latency in video frame durations ($L_{avg}$) and a peak instantaneous latency in video frame durations ($L_{peak}$), wherein the channel bandwidth parameter set comprises an available channel bandwidth ($BW_{chan}$), and wherein the video quality parameter set comprises an average encoder output bit rate ($BR_{enc}$), a VBV buffer allowance in terms of number of average encoded video frame size that is based on an average encode bit rate and an encoded video frame rate ($N_{vbv}$), and ratio between maximum allowed encoded video frame size and average encoded video frame size ($R_{max}$); and
   configure the video encoding system based on the provided two parameter sets (Si, Sj) and the computed parameter set (Sk) to obtain a desired media rate control.

10. The non-transitory computer-readable storage medium of claim 9, configure the video encoding system based on the provided two parameter sets (Si, Sj) and the computed parameter set (Sk) to obtain a desired media rate control comprises:
   computing video encode parameters (VEPs) and system management parameters (SMPs) based on the provided user configuration inputs including the two of the three parameter sets (Si and Sj) and the computed remaining one of the three parameter sets (Sk); and
   configuring the video encoding system based on the computed VEPs and SMPs to obtain the media rate control.

11. A non-transitory computer-readable storage medium for media rate control in video encoding system, when executed by a computing device, cause the computing device to:
   provide user configuration inputs, wherein the user configuration inputs comprise two parameter sets (Si and Sj) out of three parameter sets (Si, Sj, and Sk), wherein the three parameter sets are latency parameter set, channel bandwidth parameter set, and video quality parameter set;
   compute a remaining one of the three parameter sets (Sk) based on the provided two parameters sets (Si, Sj), wherein the remaining one of the three parameter sets based on the provided two of the three parameter sets is computed using the following mathematical model:

$$L_{peak} = \frac{N_{VBV}}{R_b}$$

$$L_{avg} = \frac{N_{peaks}(R_{max}-1)(N_{VBV}+R_b-2R_2)}{2R_b(N_b-N_{peaks})(R_b-R_2)} + \frac{R_2}{R_b}$$

wherein $R_2$ and $R_b$ are computed using, $$R_2 = \frac{N_b - R_{max}N_{peaks}}{N_b - N_{peaks}}$$

$$R_b = \frac{BW_{chan}}{BR_{enc}}$$

wherein $N_b$ is a number of video frames over which an average encoded bit rate is achieved, $R_{max}$ is a ratio between maximum allowed encoded video frame size and average encoded video frame size, and $N_{peaks}$ is a number of video frames of size $R_{max}$ that can be observed over durations of $N_b$ video frames based on a key frame interval and number of scene changes expected in a duration; and
   configure the video encoding system based on the provided two parameter sets (Si, Sj) and the computed parameter set (Sk) to obtain a desired media rate control.

\* \* \* \* \*